United States Patent
Kim

(10) Patent No.: US 11,680,614 B2
(45) Date of Patent: Jun. 20, 2023

(54) PAD LINER FOR BRAKE APPARATUS

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/410,334

(22) Filed: Aug. 24, 2021

(65) Prior Publication Data

US 2022/0065311 A1 Mar. 3, 2022

(30) Foreign Application Priority Data

Aug. 25, 2020 (KR) ........................ 10-2020-0107115

(51) Int. Cl.
*F16D 65/097* (2006.01)
*F16D 65/00* (2006.01)
*F16D 55/227* (2006.01)

(52) U.S. Cl.
CPC ....... *F16D 65/0972* (2013.01); *F16D 55/227* (2013.01); *F16D 65/0087* (2013.01)

(58) Field of Classification Search
CPC ... F16D 65/0972; F16D 55/227; F16D 65/007
USPC .............................................. 188/73.37–73.39
See application file for complete search history.

(56) References Cited

U.S. PATENT DOCUMENTS 6,644,444 B1 * 11/2003 Paravisi ................ F16D 55/228
188/73.38
8,439,171 B2 * 5/2013 Kaneko ............... F16D 65/0977
188/73.38

FOREIGN PATENT DOCUMENTS

DE 202021100674 U1 * 6/2021 ............ B60T 13/741
KR 10-2019-0021566 A 3/2019

* cited by examiner

*Primary Examiner* — Melanie Torres Williams
(74) *Attorney, Agent, or Firm* — Morgan, Lewis & Bockius LLP

(57) ABSTRACT

A pad liner for a brake apparatus may include: a pad liner body disposed between a plurality of pin members; pad liner support parts extending from two opposing ends of the pad liner body, respectively, and configured to support the plurality of pin members, respectively; a pad liner return part connected to the pad liner body so as to press a first brake pad, and brought into contact with the first brake pad so as to provide an elastic restoring force when a brake pedal is released, such that the first brake pad is returned to original state; and a pad liner extension part connected to the pad liner body, and brought into contact with a second brake pad so as to press the second brake pad.

18 Claims, 12 Drawing Sheets

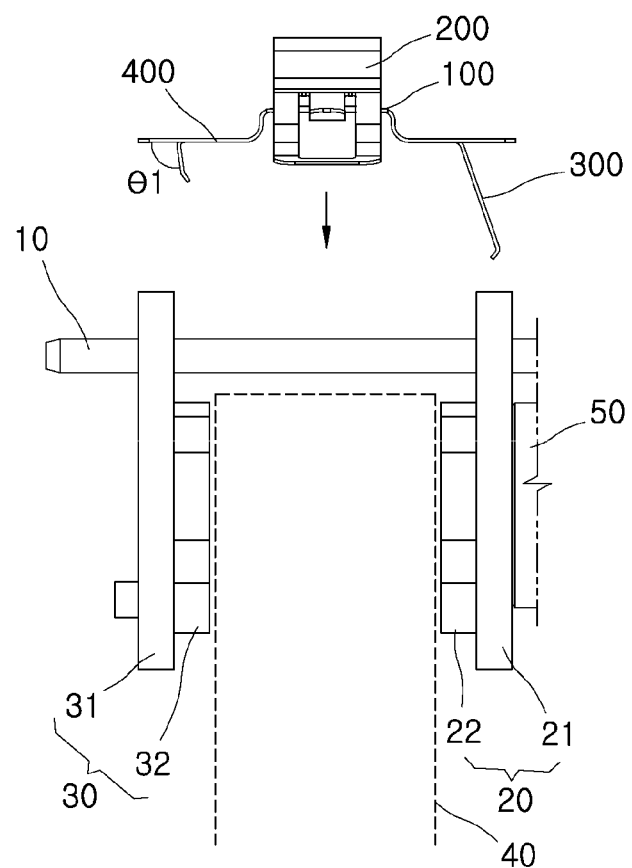

PAD LINER FOR BRAKE APPARATUS

CROSS-REFERENCE TO RELATED APPLICATION

This application claims the benefit under 35 U.S.C. § 119(a) of Korean Patent Application No. 10-2020-0107115 filed on Aug. 25, 2020 in the Korean Intellectual Property Office, the entire disclosure of which is incorporated herein by reference for all purposes.

BACKGROUND

Field

Exemplary embodiments of the present disclosure relate to a pad liner for a braking apparatus, and more particularly, to a pad liner for a brake apparatus, which can prevent the generation of not only rattle noise but also drag torque.

Discussion of the Background

In general, a brake pad of a brake apparatus for braking refers to a component that is brought into contact with a brake disk to provide a braking force. The brake pad includes a plurality of parts.

However, while the brake pad is brought into contact with the brake disk or separated from the brake disk when a brake pedal is pressed or released, the parts may interfere with each other to generate rattle noise. Furthermore, when the brake pedal is released, the brake pad and the brake disk may not be completely separated from each other, but be contacted with each other to generate drag torque. Therefore, there is a need for a device capable of solving the problem.

The related art of the present disclosure is disclosed in Korean Patent Application Laid-Open No. 10-2019-0021566 published on Mar. 6, 2019 and entitled "Pad Liner for Caliper".

SUMMARY

Various embodiments are directed to a pad liner for a brake apparatus, which can prevent the generation of not only rattle noise but also drag torque.

In an embodiment, a pad liner for a brake apparatus may include: a pad liner body disposed between a plurality of pin members; pad liner support parts extending from two opposing ends of the pad liner body, respectively, and configured to support the plurality of pin members, respectively; a pad liner return part connected to the pad liner body so as to press a first brake pad, and brought into contact with the first brake pad so as to provide an elastic restoring force when a brake pedal is released, such that the first brake pad is returned to original state; and a pad liner extension part connected to the pad liner body, and brought into contact with a second brake pad so as to press the second brake pad.

The pad liner return part may include: a first pad liner return part extending from the pad liner body toward one side of the pad liner, and brought into contact with a first back plate of the first brake pad so as to press the first back plate; and a second pad liner return part extending from the first pad liner return part and bent toward a first friction member of the first brake pad, and brought into contact with the first back plate.

The pad liner return part may further include a first return notification part extending from an end of the second pad liner return part and bent in a direction facing the pad liner extension part.

The second pad liner return part may include: a second pad liner return protrusion part protruding from the first pad liner return part toward the first back plate; and a second pad liner return contact part extending from the second pad liner return protrusion part toward a first friction member, bent at a predetermined angle, brought into contact with the first back plate, and having an end connected to the first return notification part.

The pad liner extension part may include: a pad liner extension body extending from the pad liner body toward an opposing side to the one side of the pad liner, and brought into contact with a second back plate of the second brake pad so as to press the second back plate; and a pad liner contact part brought into contact with the second back plate, extending from the pad liner extension body toward a second friction member of the second brake pad, and bent at a predetermined angle.

The angle between the pad liner contact part and the pad liner extension body may exceed 90 degrees. When brought into contact with the second back plate, the pad liner contact part may be elastically deformed and brought into surface contact with the second back plate.

The pad liner extension part may further include a second return notification part extending from an end of the pad liner contact part toward the pad liner return part and bent at a predetermined angle.

Each of the pad liner support parts may further include a pad liner support body extending from one of the two opposing ends of the pad liner body and bent toward the respective pin member, and configured to support the respective pin member; and a pad liner mounting part extending from the pad liner support body, bent toward the respective pin member, and brought into contact with the respective pin member.

In accordance with the embodiments of the present disclosure, the pad liner for a brake apparatus may apply a load by pressing the first and second brake pads at regular positions when the brake is pressed or released, thereby preventing rattle noise.

Furthermore, the pad liner may separate the first and second brake pads from the brake disk by providing an elastic restoring force to the first brake pad through the pad liner return part when the brake is released, thereby preventing the generation of drag torque.

Furthermore, as the pad liner extension part and the second back plate of the second brake pad meet at a right angle when the pad liner extension part is brought into contact with the second back plate, the pad liner extension part and the second brake pad may be brought into surface contact with each other, such that the pad liner extension part stably supports the second brake pad.

Furthermore, since the pad liner return part has the first return notification part, the first return notification part may be brought into contact with the brake disk to generate noise, when the first friction member is worn. Thus, a driver may rapidly recognize the replacement period of the brake pad.

Furthermore, since the pad liner extension part has the second return notification part, the second return notification part may be brought into contact with the brake disk to generate noise, when the second friction member is worn. Thus, a driver may rapidly recognize the replacement period of the brake pad.

BRIEF DESCRIPTION OF THE DRAWINGS

FIGS. 8A and 8B are a diagram illustrating a process in which the pad liner for a brake apparatus for a vehicle in accordance with the embodiment of the present disclosure is mounted on a pin member.

DETAILED DESCRIPTION OF THE ILLUSTRATED EMBODIMENTS

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
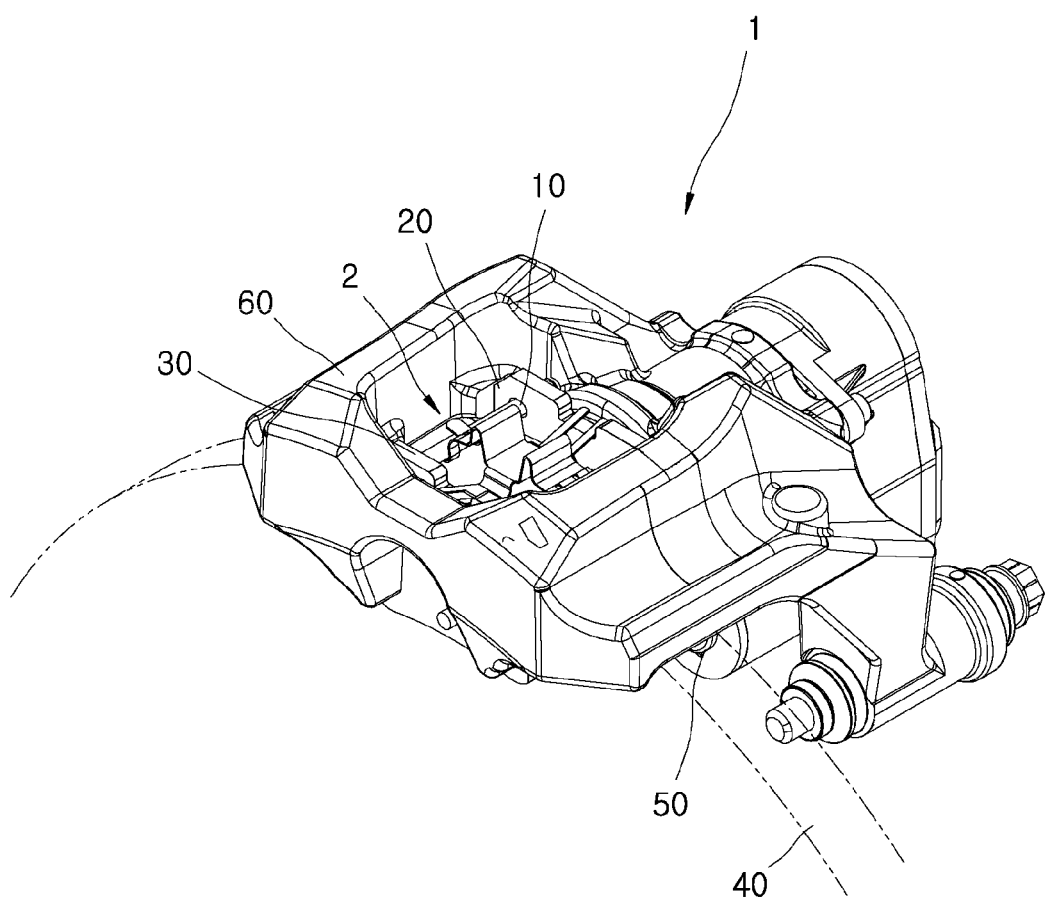
FIG. 1 is a perspective view illustrating a brake apparatus for a vehicle in accordance with an embodiment of the present disclosure.
Figure 2:
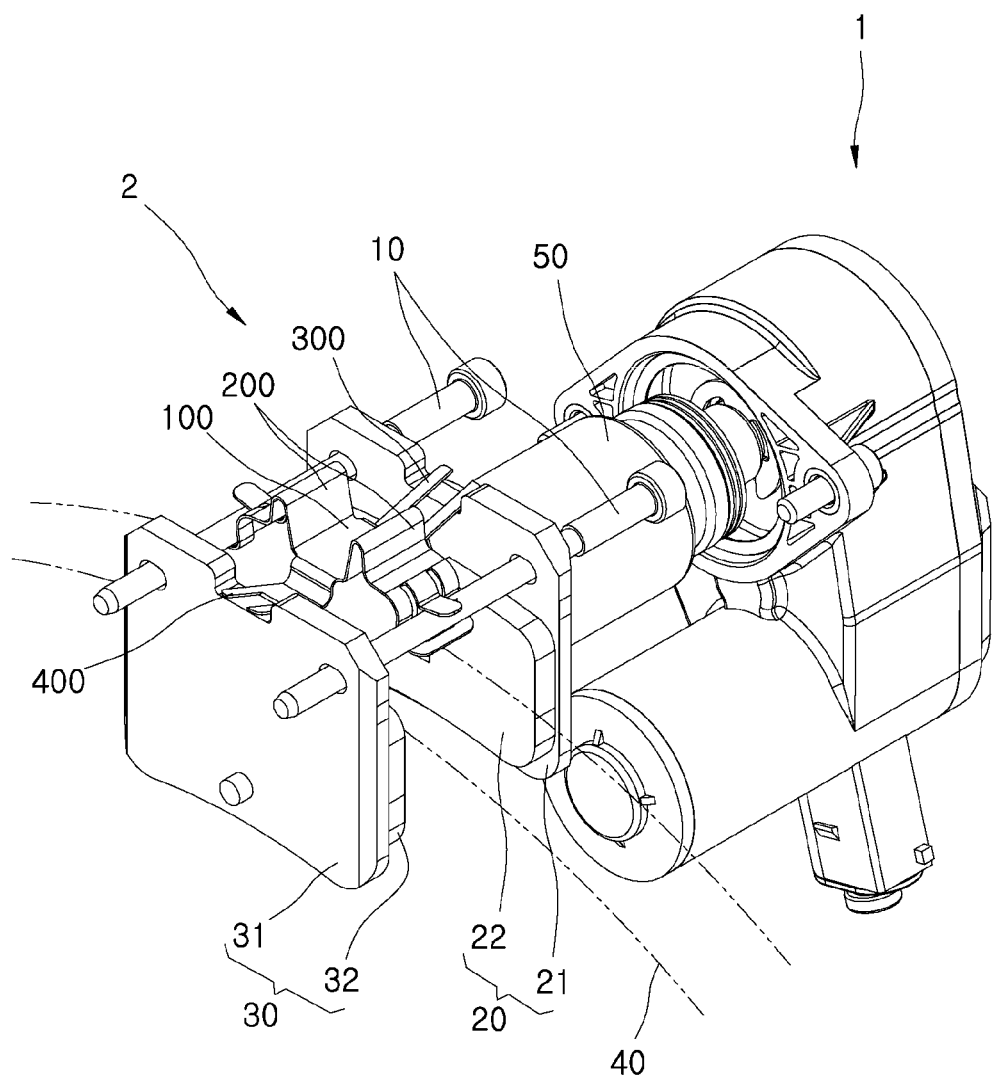
FIG. 2 is a perspective view illustrating main parts of the brake apparatus for a vehicle in accordance with the embodiment of the present disclosure.
Figure 3:
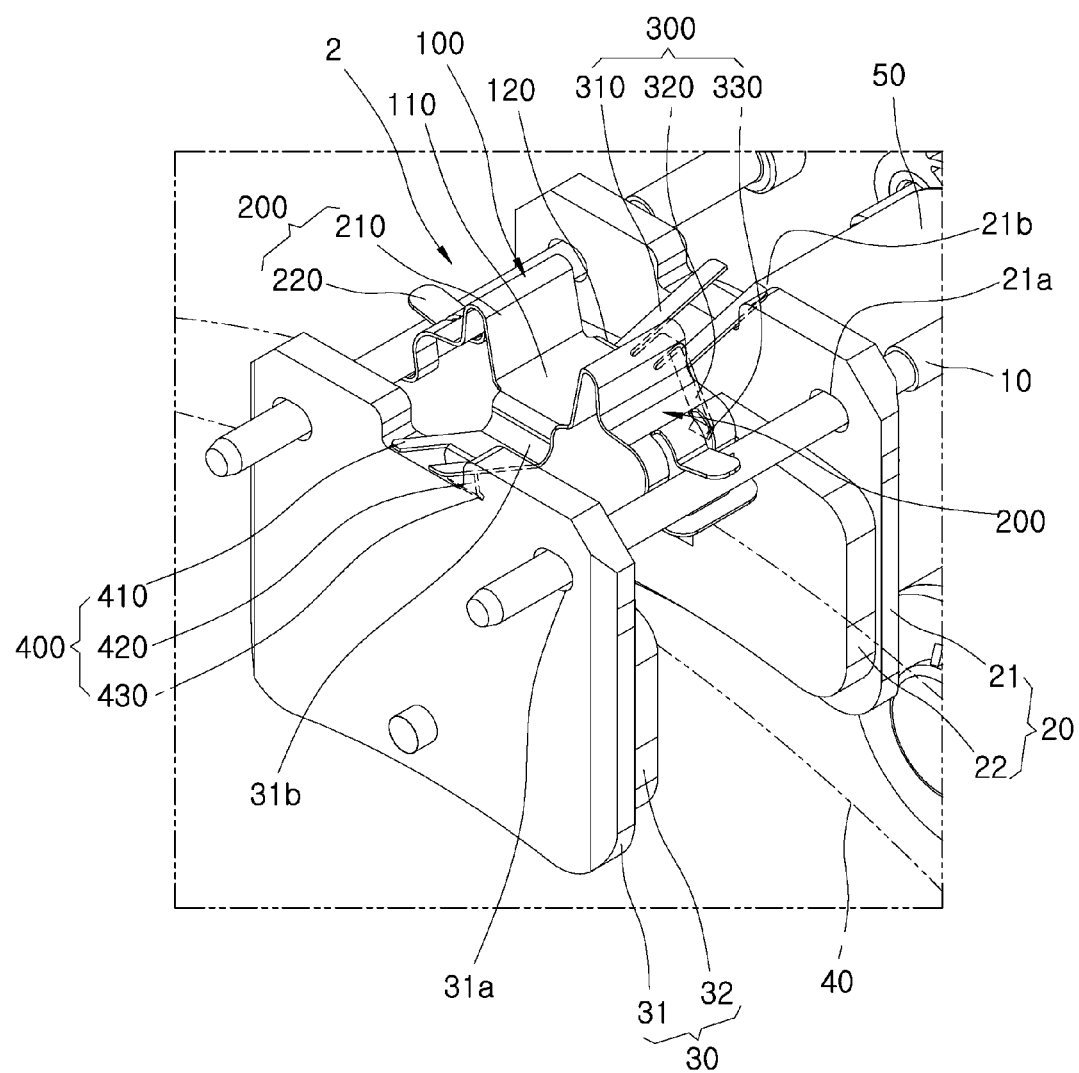
FIG. 3 is an expanded view illustrating the main parts of FIG. 2.
Figure 4:
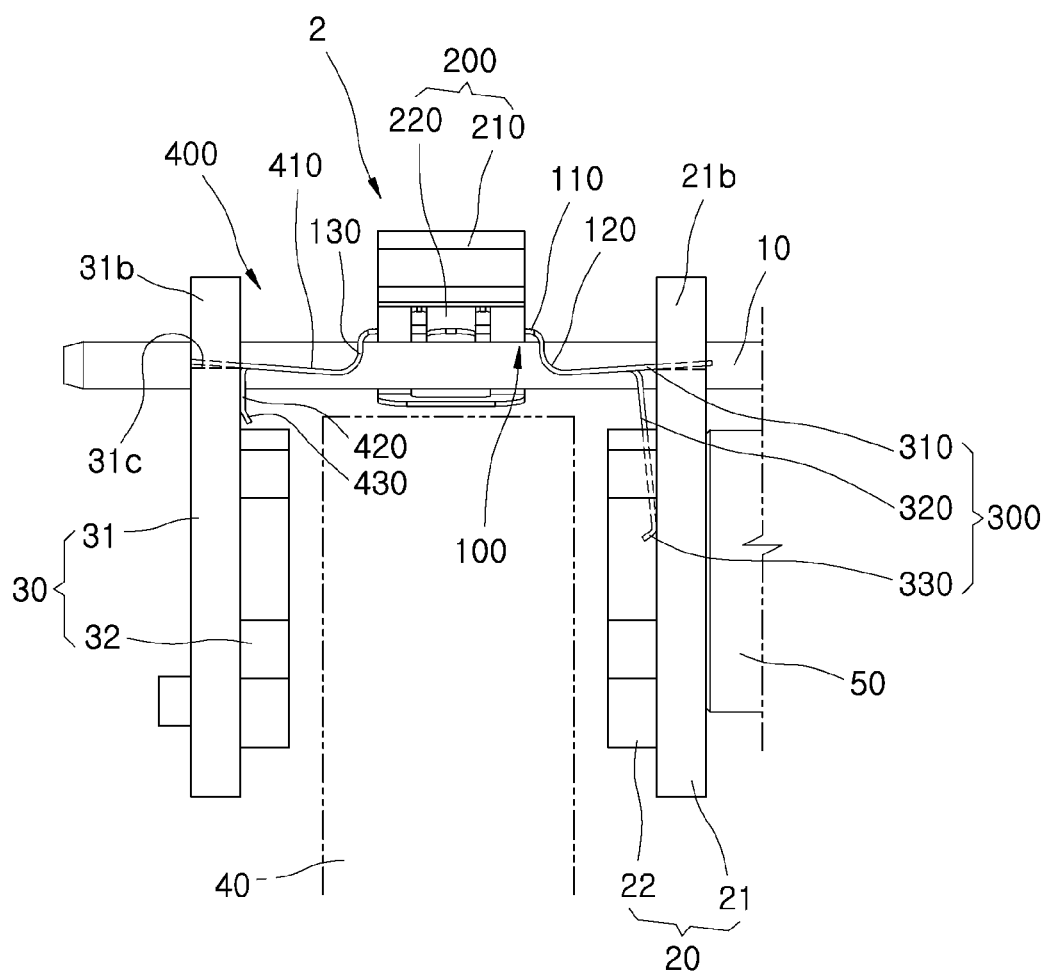
FIG. 4 is a side cross-sectional view illustrating the main parts of the brake apparatus for a vehicle in accordance with the embodiment of the present disclosure.
Figure 5:
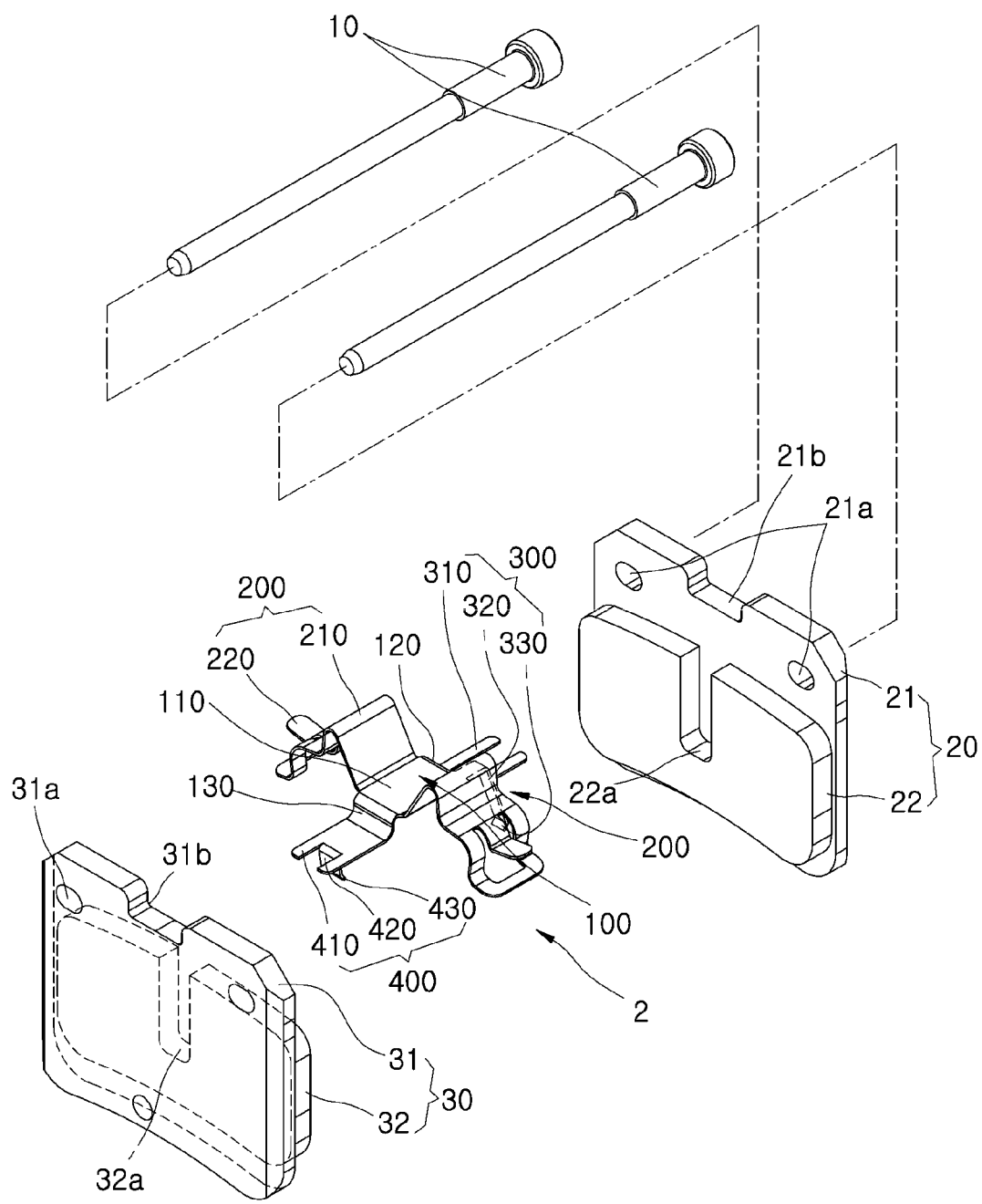
FIG. 5 is an exploded perspective view illustrating the brake apparatus for a vehicle in accordance with the embodiment of the present disclosure.
Figure 6:
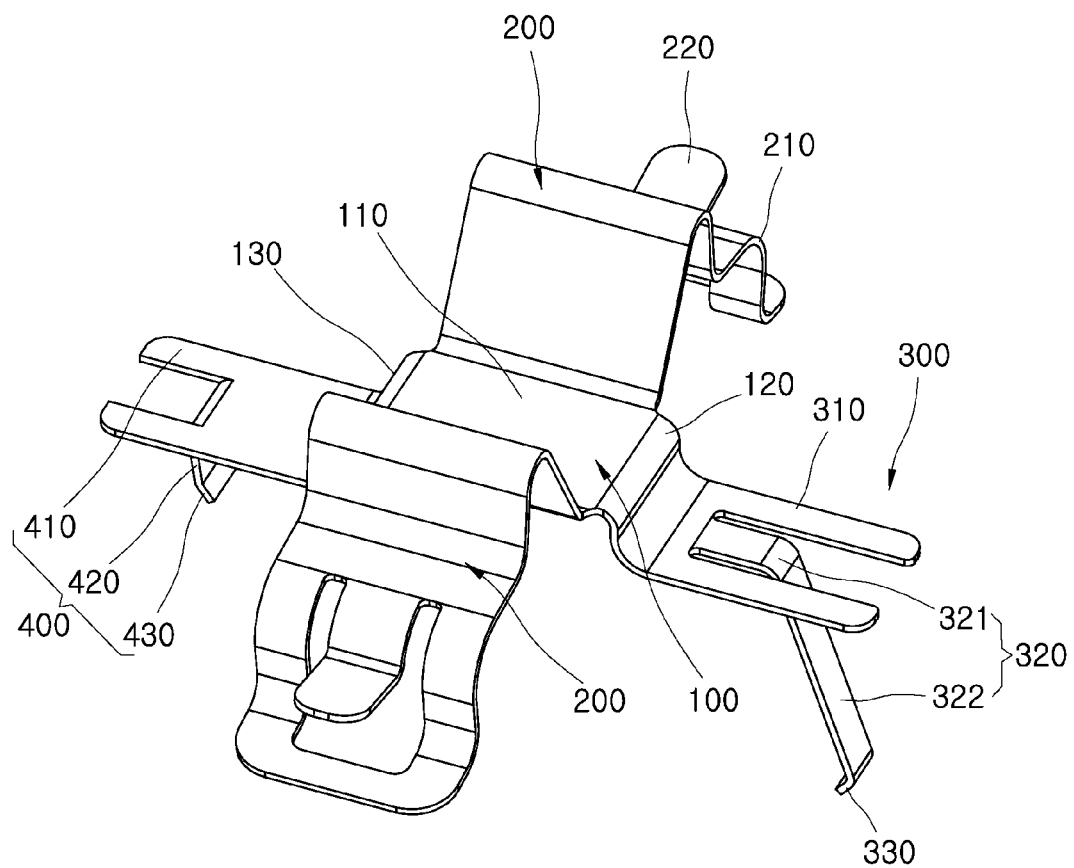
FIG. 6 is a perspective view illustrating a pad liner for a brake apparatus in accordance with an embodiment of the present disclosure.
Figure 7:
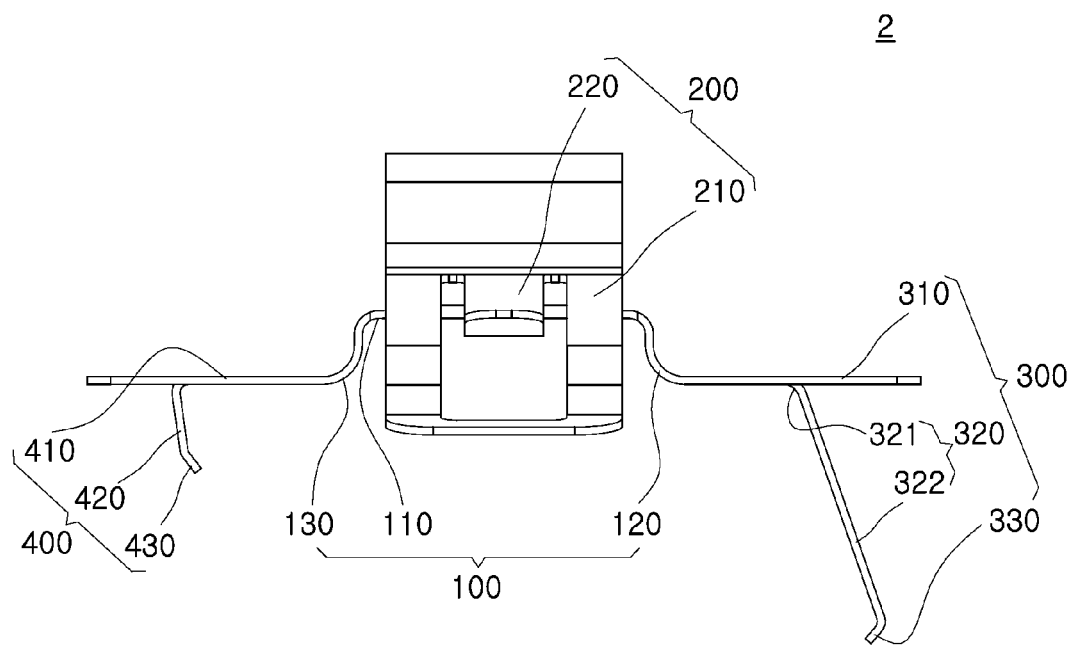
FIG. 7 is a side view illustrating the pad liner for a brake apparatus in accordance with the embodiment of the present disclosure.
Figure 8B:
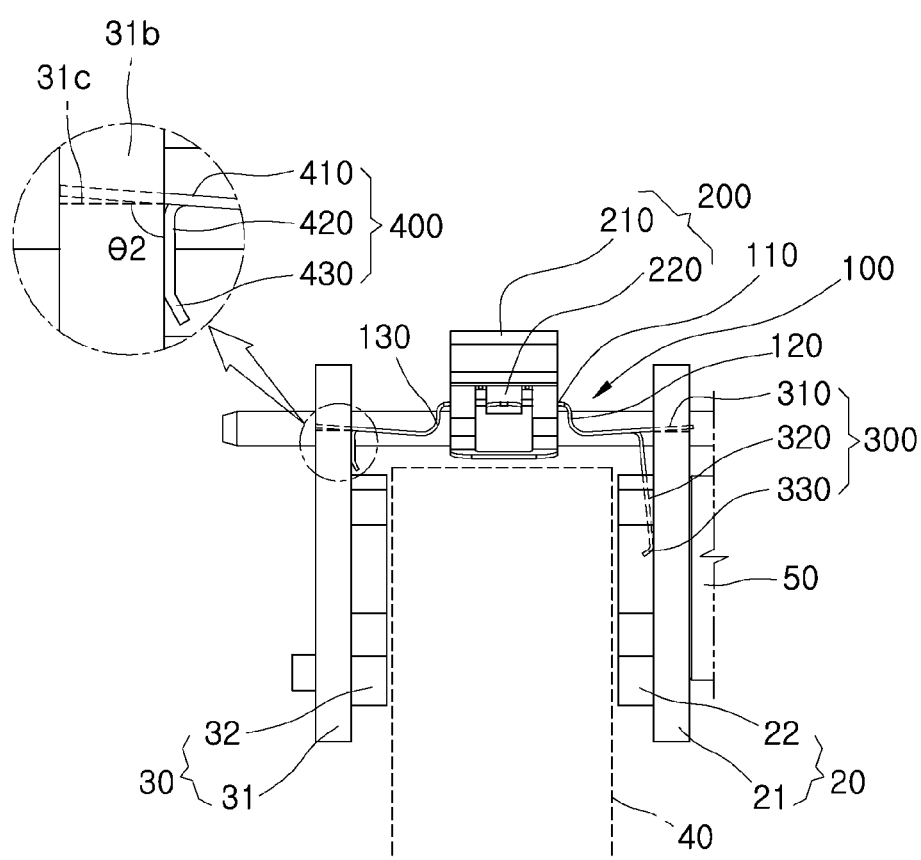
Figure 9:
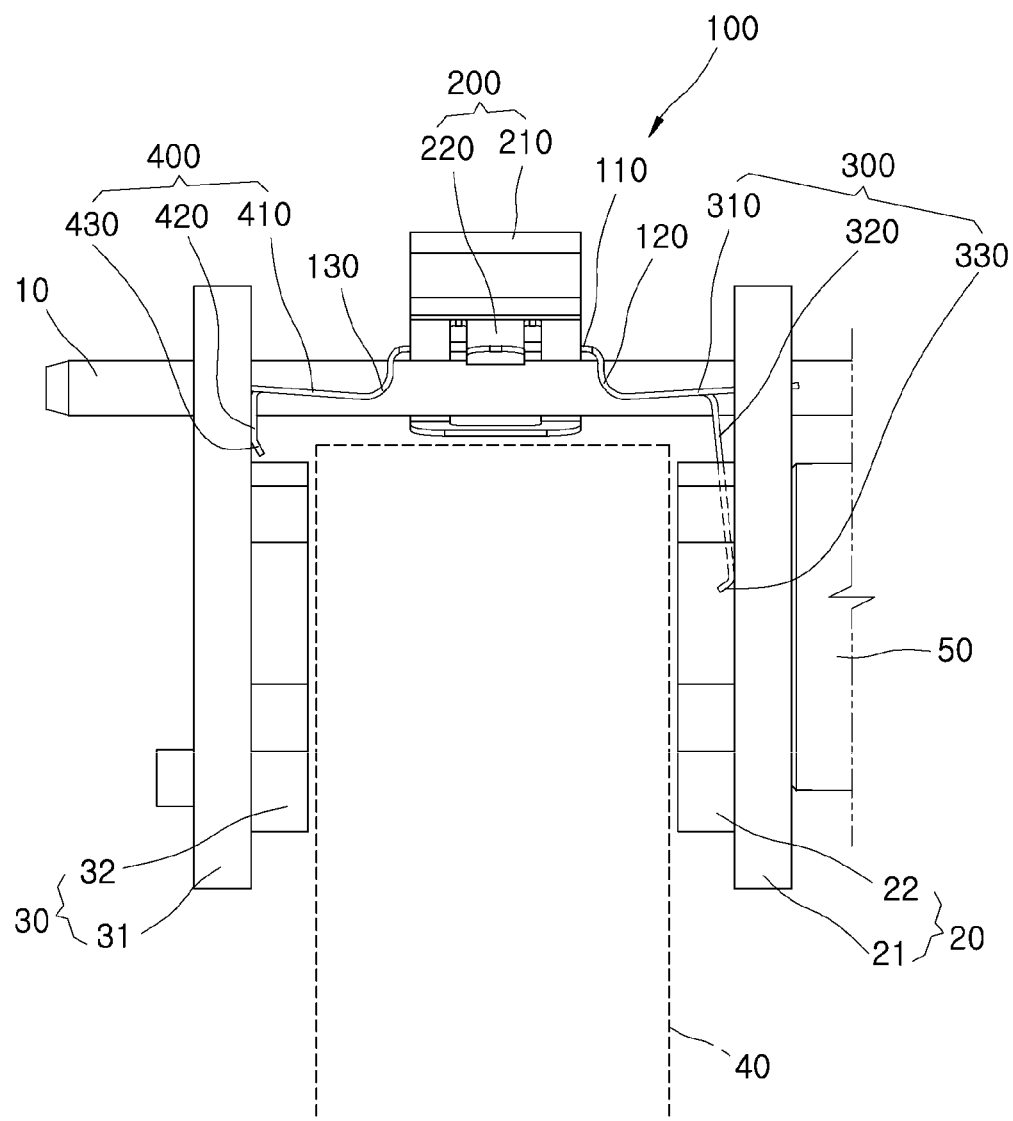
FIG. 9 is a diagram illustrating a state before a pressing part of the brake apparatus for a vehicle in accordance with the embodiment of the present disclosure presses a first brake pad.
Figure 10:
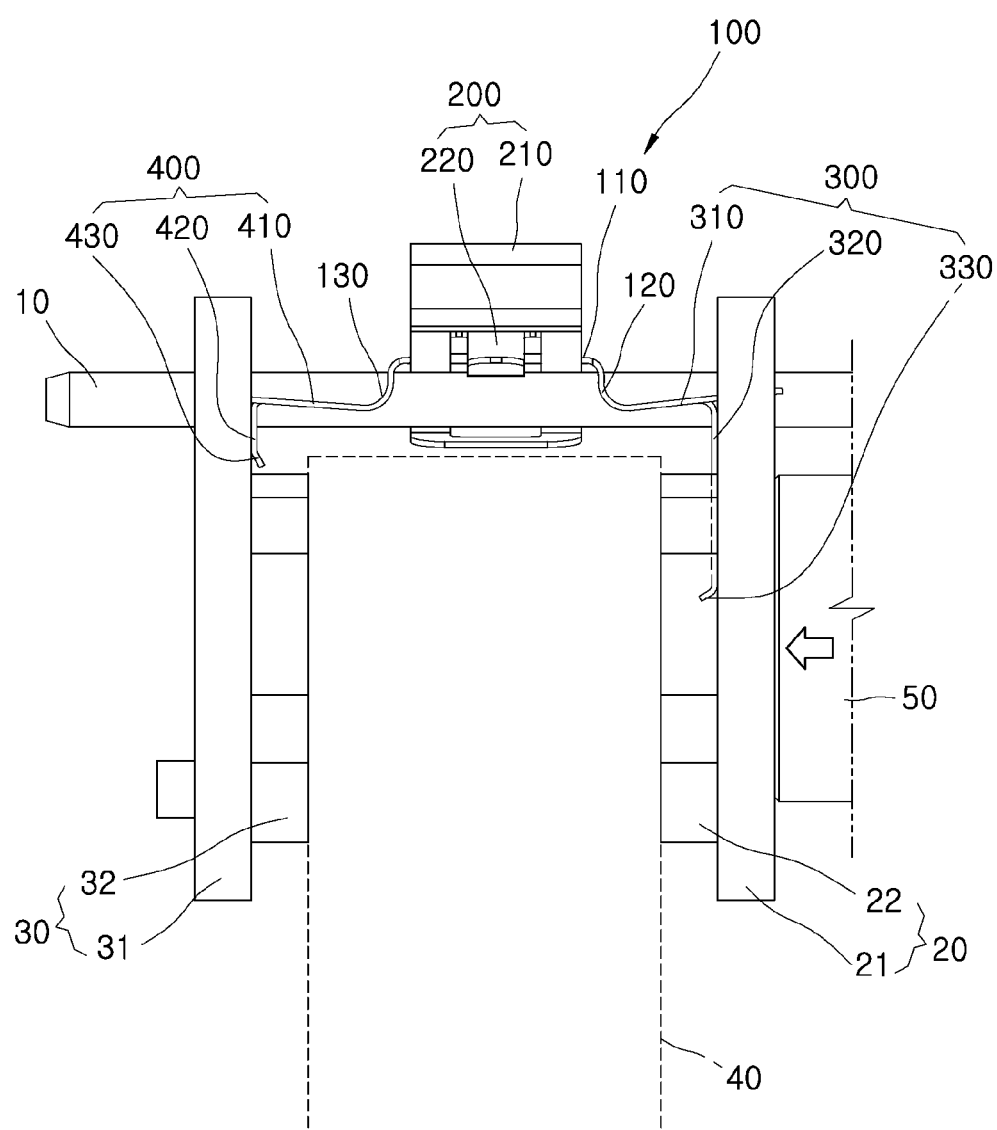
FIG. 10 is a diagram illustrating a state in which the first brake pad and a second brake pad are brought into contact with a brake disk by an operation of the pressing part of the brake apparatus for a vehicle in accordance with the embodiment of the present disclosure.
Figure 11:
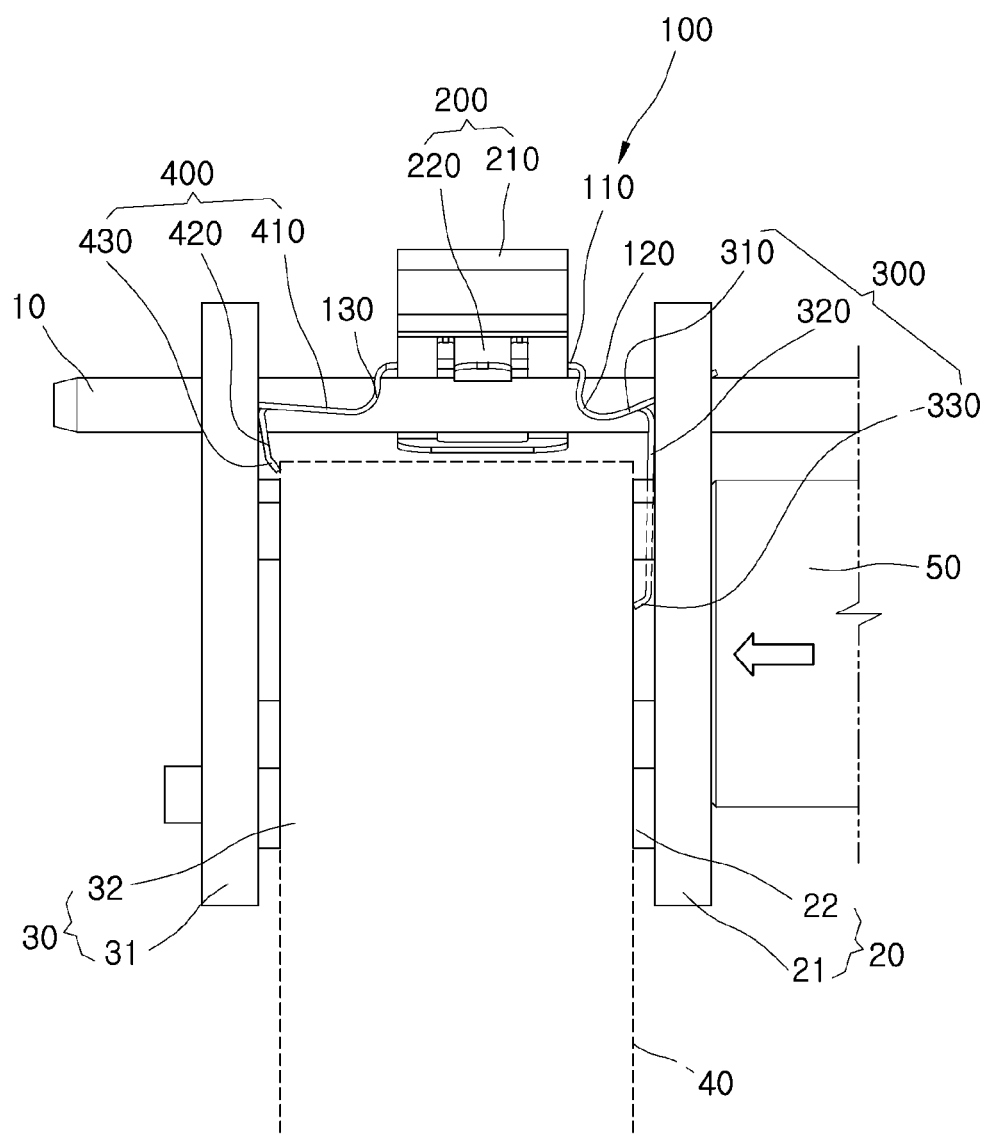
FIG. 11 is a diagram illustrating that a first return notification part of a pad liner return part and a second return notification part of a pad liner extension part in the pad liner for a brake apparatus in accordance with the embodiment of the present disclosure notify the wear conditions of the first brake pad and the second brake pad, respectively.

FIG. 1 is a perspective view illustrating a brake apparatus for a vehicle in accordance with an embodiment of the present disclosure, FIG. 2 is a perspective view illustrating main parts of the brake apparatus for a vehicle in accordance with the embodiment of the present disclosure, FIG. 3 is an expanded view illustrating the main parts of FIG. 2, FIG. 4 is a side cross-sectional view illustrating the main parts of the brake apparatus for a vehicle in accordance with the embodiment of the present disclosure, FIG. 5 is an exploded perspective view illustrating the brake apparatus for a vehicle in accordance with the embodiment of the present disclosure, FIG. 6 is a perspective view illustrating a pad liner for a brake apparatus in accordance with an embodiment of the present disclosure, FIG. 7 is a side view illustrating the pad liner for a brake apparatus in accordance with the embodiment of the present disclosure, FIGS. 8A and 8B are a diagram illustrating a process in which the pad liner for a brake apparatus for a vehicle in accordance with the embodiment of the present disclosure is mounted on a pin member, FIG. 9 is a diagram illustrating a state before a pressing part of the brake apparatus for a vehicle in accordance with the embodiment of the present disclosure presses a first brake pad, FIG. 10 is a diagram illustrating a state in which the first brake pad and a second brake pad are brought into contact with a brake disk by an operation of the pressing part of the brake apparatus for a vehicle in accordance with the embodiment of the present disclosure, and FIG. 11 is a diagram illustrating that a first return notification part of a pad liner return part and a second return notification part of a pad liner extension part in the pad liner for a brake apparatus in accordance with the embodiment of the present disclosure notify the wear conditions of the first brake pad and the second brake pad, respectively.

Referring to FIGS. 1 to 8, a brake apparatus 1 for a vehicle in accordance with an embodiment of the present disclosure includes a plurality of pin members 10, a first brake pad 20, a second brake pad 30, a brake disk 40, a pressing part 50 and a pad liner 2 for a brake apparatus.

The pad liner 2 for a brake apparatus in accordance with the embodiment of the present disclosure includes a pad liner body 100, a pair of pad liner support parts 200, a pad liner return part 300 and a pad liner extension part 400. The pad liner body 100 is disposed between the pair of pin members 10. The pair of pin members 10 are installed in a caliper body 60 so as to be spaced apart from each other. The caliper body 60 has a hole-shaped installation part (not illustrated) formed in a central portion thereof and disposed in a top-to-bottom direction (based on FIG. 1), and the pair of pin members 10 are installed in the installation part so as to be spaced apart from each other.

The pad liner body 100 is disposed between the pair of pin members 10. The pad liner body 100 includes a first pad liner body 110, a second pad liner body 120 and a third pad liner body 130. The first pad liner body 110 is disposed between the pair of pin members 10. The second pad liner body 120 is bent and extending from the first pad liner body 110 toward one side. At this time, the second pad liner body 120 is bent and extending downward from the first pad liner body 110 (based on FIGS. 3 and 4). The third pad liner body 130 is bent and extends from the first pad liner body 110 toward the other side. At this time, the third pad liner body 130 is bent and extends downward from the first pad liner body 110 (based on FIGS. 3 and 4).

The pair of pad liner support parts 200 extend from both ends of the pad liner body 100, respectively, and serve to support the pair of pin members 10, respectively. Specifically, the pair of pad liner support parts 200 extend from both ends of the pad liner body 100 so as to be located under the pair of pin members 10 (based on FIGS. 3 and 4), respectively, and support the respective pin members 10. The pad liner 2 for a brake apparatus may be restricted from moving downward on the pair of pin members 10, which makes it possible to effectively prevent rattle noise.

The pad liner return part 300 is connected to the pad liner body 100 so as to press the first brake pad 20, and brought into contact with the first brake pad 20 so as to provide an elastic restoring force when a brake pedal is released, thereby returning the first brake pad 20 to the original state.

The pad liner return part 300 may apply a load through the contact with the first brake pad 20, and press the first brake pad 20 so as to restrict the first brake pad 20 from moving upward, thereby effectively preventing rattle noise.

The pad liner return part 300 extends from the second pad liner body 120 of the pad liner body 100 toward the first brake pad 20, and brought into contact with a first back plate 21 of the first brake pad 20. The pad liner return part 300 is elastically deformed by the first brake pad 20 which is moved toward the brake disk 40 by the pressing part 50 when the brake pedal is pressed, and provides an elastic restoring force to the first brake pad 20 when the brake pedal is released. At this time, the pressing part 50 is mounted in the caliper body 60, and includes a motor module (not illustrated), a screw bar (not illustrated), a nut (not illustrated) and a piston (not illustrated). The pressing part 50 may be modified in various manners as long as the pressing part 50 presses the first brake pad 20.

The pad liner extension part 400 is connected to the pad liner body 100, and presses the second brake pad 30 through the contact with the second brake pad 30. The pad liner extension part 400 extends from the third pad liner body 130 of the pad liner body 100 toward the second brake pad 30, and brought into contact with a second back plate 31 of the second brake pad 30. The pad liner extension part 400 may apply a load through the contact with the second brake pad 30, and press the second brake pad 30 so as to restrict the second brake pad 30 from moving upward, thereby effectively preventing rattle noise.

The pad liner return part 300 includes a first pad liner return part 310, a second pad liner return part 320 and a first return notification part 330. The first pad liner return part 310 extends from the pad liner body 100 to one side, and presses the first back plate 21 through the contact with the first back plate 21 of the first brake pad 20. Specifically, the first brake pad 20 includes the first back plate 21 and a first friction member 22. The first brake pad 20 is disposed on one side of the brake disk 40 so as to move on the pair of pin members 10. Specifically, the first back plate 21 has a pair of first through-holes 21a through which the pair of pin members 10 are passed. Through this structure, the first brake pad 20 may be not only easily coupled to the pair of pin members 10, but also moved along the pair of pin members 10.

The first friction member 22 is coupled to the first back plate 21, and brought into contact with the brake disk 40. The first friction member 22 may be made of an elastic material, and brought into contact with one side of the brake disk 40. The first friction member 22 is coupled to the first back plate 21 so as to face one side of the brake disk 40.

The first pad liner return part 310 extends horizontally from the pad liner body 100, and inserted into a first installation groove 21b of the first back plate 21 so as to come into contact with the first back plate 21. At this time, the first pad liner return part 310 is elastically deformed and tilted at a predetermined angle, when brought into contact with the first back plate 21.

The second pad liner return part 320 is bent and extended from the first pad liner return part 310 toward the first friction member 22 of the first brake pad 20, and brought into contact with the first back plate 21. The second pad liner return part 320 is brought into contact with the central portion of the first back plate 21. At this time, the first friction member 22 has a first coupling groove 22a formed in the center thereof, and the second pad liner return part 320 is inserted into the first coupling groove 22a and brought into contact with the first back plate 21.

The second pad liner return part 320 is elastically deformed by the first brake pad 20 which is moved toward the brake disk 40 by the pressing part 50 when the brake pedal is pressed, and provides an elastic restoring force to the first brake pad 20 when the brake pedal is released.

The first return notification part 330 is bent and extends from an end of the second pad liner return part 320 so as to face the pad liner extension part 400. When the first friction member 22 is worn, the first return notification part 330 is brought into contact with the brake disk 40, and generates noise to inform a driver of a replacement period of the first brake pad 20. Thus, the driver may recognize the replacement period of the first brake pad 20.

The second pad liner return part 320 includes a second pad liner return protrusion part 321 and a second pad liner return contact part 322. The second pad liner return protrusion part 321 protrudes from the first pad liner return part 310 toward the first back plate 21. At this time, the second pad liner return protrusion part 321 protrudes in a horizontal direction.

The second pad liner return contact part 322 extends from the second pad liner return protrusion part 321 toward the first friction member 22 so as to be bent at a predetermined angle, and brought into contact with the first back plate 21, and has an end connected to the first return notification part 330. The second pad liner return contact part 322 extends downward (based on FIG. 3) from the second pad liner return protrusion part 321 so as to be bent at a predetermine angle, and brought into contact with the first back plate 21. Thus, when the brake pedal is released, the second pad liner return contact part 322 provides an elastic restoring force to the first brake pad 20.

The pad liner extension part 400 includes a pad liner extension body 410, a pad liner contact part 420 and a second return notification part 430. The pad liner extension body 410 extends from the pad liner body 100 to the other side, and presses the second back plate 31 through the contact with the second back plate 31 of the second brake pad 30. Specifically, the second brake pad 30 includes the second back plate 31 and a second friction member 32. The second back plate 31 is coupled to the pair of pin members 10, and disposed on the other side of the brake disk 40. The second back plate 31 has a pair of second through-holes 31a through which the pair of pin members 10 are passed (see FIGS. 5 to 7). Through this structure, the second brake pad 30 may be easily coupled to the pair of pin members 10.

The second friction member 32 is coupled to the second back plate 31, and brought into contact with the brake disk 40. The second friction member 32 may be made of an elastic material, and brought into contact with the other side of the brake disk 40. The second friction member 32 is coupled to the second back plate 31 so as to face the other side of the brake disk 40.

The pad liner extension body 410 extends horizontally from the pad liner body 100, and inserted into a second installation groove 31b of the second back plate 31 so as to come into contact with the second back plate 31. At this time, the pad liner extension body 410 is elastically deformed and tilted at a predetermined angle, when brought into contact with the second back plate 31.

The pad liner contact part 420 is contacted with the second back plate 31 which extends from the pad liner extension body 410 toward the second friction member 32 of the second brake pad 30 so as to be bent at a predetermined angle. At this time, the second is friction member 32 has a second coupling groove 32a formed in the center portion thereof, and the pad liner contact part 420 is inserted into the second coupling groove 32a and brought into contact with the second back plate 31.

Referring to FIGS. 8A and 8B, an angle θ1 between the pad liner contact part 420 and the pad liner extension body 410 exceeds 90°. When brought into contact with the second back plate 31, the pad liner contact part 420 is elastically deformed and brought into surface contact with the second back plate 31. Specifically, an angle θ2 between the pad liner contact part 420 and a bottom surface 31c of the second installation groove 31b formed in the second back plate 31 may be set to 90°. Thus, the pad liner contact part 420 may be brought into surface contact with the second back plate 31, such that the pad liner extension part 400 stably supports the second brake pad 30.

The second return notification part 430 extends from an end of the pad liner contact part 420 toward the pad liner return part 300 so as to be bent at a predetermined angle. When the second friction member 32 is worn, the second return notification part 430 is brought into contact with the brake disk 40, and generates noise to notify the replacement period of the second brake pad 30 to a driver. Thus, the driver may recognize the replacement period of the second brake pad 30.

The pair of pad liner support parts 200 include a pair of pad liner support bodies 210 and a pair of pad liner mounting parts 220. The pair of pad liner support bodies 210 extend from both ends of the pad liner body 100 so as to be bent toward the pair of pin members 10, and support the pair of pin members 10, respectively. Specifically, the pair of pad liner support bodies 210 extend from both ends of the pad liner body 100 so as to be bent toward the pair of pin members 10 and located under the pair of pin members 10 (based on FIGS. 3 and 9 to 11), and support the bottoms of the pair of pin members 10 (based on FIGS. 3 and 9 to 11).

The pair of pad liner mounting parts 220 extend from the pair of pad liner support bodies 210 so as to be bent toward the pair of pin members 10, respectively, and brought into contact with the pair of pin members 10, respectively. The pair of pad liner mounting parts 220 are brought into contact with the tops of the pair of pin members 10 (based on FIGS. 3 and 9 to 11), respectively. Thus, the pin member 10 may be stably mounted between the pad liner support body 210 and the pad liner mounting part 220. Thus, the pad liner 2 for a brake apparatus in accordance with the embodiment of the present disclosure may be not only stably coupled to the pair of pin members 10, but also restricted from moving upward on the pair of pin members 10, thereby effectively preventing rattle noise.

Hereafter, the operation and effect of the pad liner 2 for a brake apparatus in accordance with the embodiment of the present disclosure will be described with reference to FIGS. 9 to 11.

When a driver steps on the brake pedal (not illustrated), the pressing part 50 presses the first brake pad 20 against the brake disk 40 (see FIGS. 9 and 10). Thus, the first and second brake pads 20 and 30 may be pressed against the brake disk 40, and generate a braking force through friction. At this time, the second pad liner return part 320 of the pad liner return part 300 is elastically deformed by the pressed first brake pad 20.

On the contrary, when the brake pedal is released, the pressing part 50 is separated from the first brake pad 20, and the elastic restoring force of the second pad liner return part 320 of the pad liner return part 300 returns the first brake pad 20, such that the first brake pad 20 is sufficiently separated from the brake disk 40. Thus, the first and second brake pads 20 and 30 are separated from the left and right sides of the brake disk 40 (based on FIGS. 9 and 10). At this time, as the first and second brake pads 20 and 30 are sufficiently separated from the brake disk 40, it is possible to prevent drag torque caused by the contact friction between the first and second brake pads 20 and 30 and the brake disk 40.

When the first friction member 22 of the first brake pad 20 and the second friction member 32 of the second brake pad 30 are worn by a preset thickness or more due to the long-term use of the brake, the first return notification part 330 of the pad liner return part 300 and the second return notification part 430 of the pad liner extension part 400 may be contacted with the brake disk 40, in the case that the first and second brake pads 20 and 30 are moved toward the brake disk 40. Therefore, the driver may feel difficulties in operating the first and second brake pads 20 and 30, and thus recognize the replacement periods of the first and second brake pads 20 and 30. At this time, the first return notification part 330 of the pad liner return part 300 and the second return notification part 430 of the pad liner extension part 400 may be brought into contact with the brake disk 40, and generate noise (see FIG. 11). Thus, the driver may recognize the replacement periods of the first and second brake pads 20 and 30, and rapidly replace the first and second brake pads 20 and 30.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pad liner for a brake apparatus, comprising:
   a pad liner body disposed between a plurality of pin members;
   pad liner support parts extending from two opposing ends of the pad liner body, respectively, and configured to support the plurality of pin members, respectively;
   a pad liner return part connected to the pad liner body so as to press a first brake pad, and brought into contact with the first brake pad so as to provide an elastic restoring force when a brake pedal is released, such that the first brake pad is returned to original state; and
   a pad liner extension part connected to the pad liner body, and brought into contact with a second brake pad so as to press the second brake pad,
   wherein the pad liner return part comprises:
   a first pad liner return part extending from the pad liner body toward one side of the pad liner, and brought into contact with a first back plate of the first brake pad so as to press the first back plate; and
   a second pad liner return part extending from the first pad liner return part and bent toward a first friction member of the first brake pad, and brought into contact with the first back plate.

2. The pad liner of claim 1, wherein the pad liner return part further comprises a first return notification part extending from an end of the second pad liner return part and bent in a direction facing the pad liner extension part.

3. The pad liner of claim 2, wherein the second pad liner return part comprises:
   a second pad liner return protrusion part protruding from the first pad liner return part toward the first back plate; and
   a second pad liner return contact part extending from the second pad liner return protrusion part toward the first friction member, bent at a predetermined angle, brought into contact with the first back plate, and having an end connected to the first return notification part.

4. The pad liner of claim 1, wherein the pad liner extension part comprises:
a pad liner extension body extending from the pad liner body toward an opposing side of the one side of the pad liner, and brought into contact with a second back plate of the second brake pad so as to press the second back plate; and
a pad liner contact part brought into contact with the second back plate, extending from the pad liner extension body toward a second friction member of the second brake pad, and bent at a predetermined angle.

5. The pad liner of claim 4, wherein an angle between the pad liner contact part and the pad liner extension body exceeds 90 degrees, wherein when brought into contact with the second back plate, the pad liner contact part is elastically deformed and brought into surface contact with the second back plate.

6. The pad liner of claim 4, wherein the pad liner extension part further comprises a second return notification part extending from an end of the pad liner contact part toward the pad liner return part and bent at a predetermined angle.

7. The pad liner of claim 1, wherein each of the pad liner support parts comprises:
a pad liner support body extending from one of the two opposing ends of the pad liner body and bent toward the respective pin member, and configured to support the respective pin member; and
a pad liner mounting part extending from the pad liner support body, bent toward the respective pin member, and brought into contact with the respective pin member.

8. A pad liner for a brake apparatus, comprising:
a pad liner body disposed between a plurality of pin members;
pad liner support parts extending from two opposing ends of the pad liner body, respectively, and configured to support the plurality of pin members, respectively;
a pad liner return part connected to the pad liner body so as to press a first brake pad, and brought into contact with the first brake pad so as to provide an elastic restoring force when a brake pedal is released, such that the first brake pad is returned to original state; and
a pad liner extension part connected to the pad liner body, and brought into contact with a second brake pad so as to press the second brake pad,
wherein each of the pad liner support parts comprises:
a pad liner support body extending from one of the two opposing ends of the pad liner body and bent toward the respective pin member, and configured to support the respective pin member; and
a pad liner mounting part branching out from the pad liner support body, extending in a different direction from the pad liner support body, bent toward the respective pin member, and brought into contact with the respective pin member, and
wherein the pad liner return part comprises:
a first pad liner return part extending from the pad liner body toward one side of the pad liner, and brought into contact with a first back plate of the first brake pad so as to press the first back plate; and
a second pad liner return part extending from the first pad liner return part and bent toward a first friction member of the first brake pad, and brought into contact with the first back plate.

9. The pad liner of claim 8, wherein the pad liner return part further comprises a first return notification part extending from an end of the second pad liner return part and bent in a direction facing the pad liner extension part.

10. The pad liner of claim 9, wherein the second pad liner return part comprises:
a second pad liner return protrusion part protruding from the first pad liner return part toward the first back plate; and
a second pad liner return contact part extending from the second pad liner return protrusion part toward the first friction member, bent at a predetermined angle, brought into contact with the first back plate, and having an end connected to the first return notification part.

11. The pad liner of claim 8, wherein the pad liner extension part comprises:
a pad liner extension body extending from the pad liner body toward an opposing side of the one side of the pad liner, and brought into contact with a second back plate of the second brake pad so as to press the second back plate; and
a pad liner contact part brought into contact with the second back plate, extending from the pad liner extension body toward a second friction member of the second brake pad, and bent at a predetermined angle.

12. The pad liner of claim 11, wherein an angle between the pad liner contact part and the pad liner extension body exceeds 90 degrees, wherein when brought into contact with the second back plate, the pad liner contact part is elastically deformed and brought into surface contact with the second back plate.

13. The pad liner of claim 11, wherein the pad liner extension part further comprises a second return notification part extending from an end of the pad liner contact part toward the pad liner return part and bent at a predetermined angle.

14. A pad liner for a brake apparatus, comprising:
a pad liner body disposed between a plurality of pin members;
pad liner support parts extending from two opposing ends of the pad liner body, respectively, and configured to support the plurality of pin members, respectively;
a pad liner return part connected to the pad liner body so as to press a first brake pad, and brought into contact with the first brake pad so as to provide an elastic restoring force when a brake pedal is released, such that the first brake pad is returned to original state; and
a pad liner extension part connected to the pad liner body, and brought into contact with a second brake pad so as to press the second brake pad,
wherein the pad liner return part and the pad liner extension part are asymmetrical to each other.

15. The pad liner of claim 14, wherein the pad liner return part comprises:
a first pad liner return part extending from the pad liner body toward one side of the pad liner, and brought into contact with a first back plate of the first brake pad so as to press the first back plate;
a second pad liner return part extending from the first pad liner return part and bent toward a first friction member of the first brake pad, and brought into contact with the first back plate; and a first return notification part extending from an end of the second pad liner return part and bent in a direction facing the pad liner extension part.

16. The pad liner of claim 15, wherein the pad liner extension part comprises:
a pad liner extension body extending from the pad liner body toward an opposing side of the one side of the pad liner, and brought into contact with a second back plate of the second brake pad so as to press the second back plate;
a pad liner contact part brought into contact with the second back plate, extending from the pad liner extension body toward a second friction member of the second brake pad, and bent at a predetermined angle; and
a second return notification part extending from an end of the pad liner contact part toward the pad liner return part and bent at a predetermined angle.

17. The pad liner of claim 16, wherein:
when the first friction member is worn, the first return notification part is brought into contact with a brake disk so as to generate noise, and
when the second friction member is worn, the second return notification part is brought into contact with the brake disk so as to generate noise.

18. The pad liner of claim 16, wherein the second pad liner return part is longer than the pad liner contact part.

* * * * *